Sept. 20, 1932.   E. G. KESLING   1,877,886
SPEED CHANGING MECHANISM
Filed March 7, 1931   3 Sheets-Sheet 2
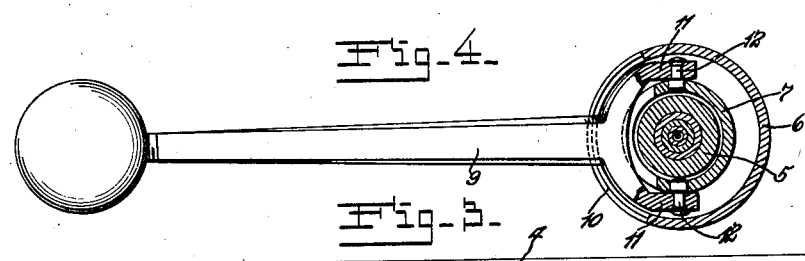
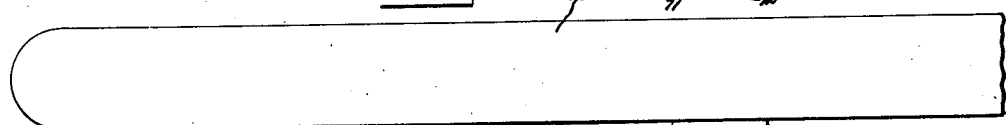
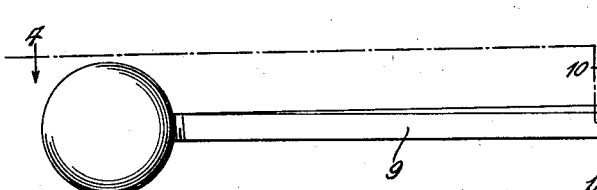
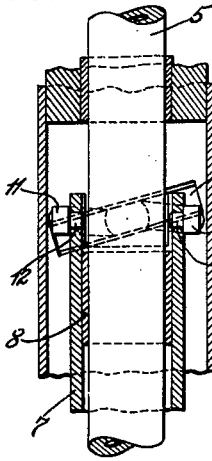
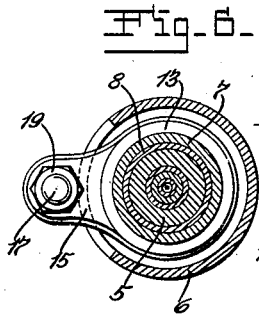
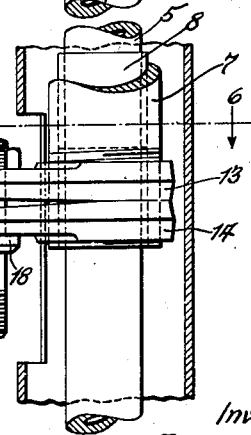
Inventor
Elmer G. Kesling
by Rippey & Kingsland
His Attorneys Sept. 20, 1932.　　　　E. G. KESLING　　　　1,877,886
SPEED CHANGING MECHANISM
Filed March 7, 1931　　　　3 Sheets-Sheet 3
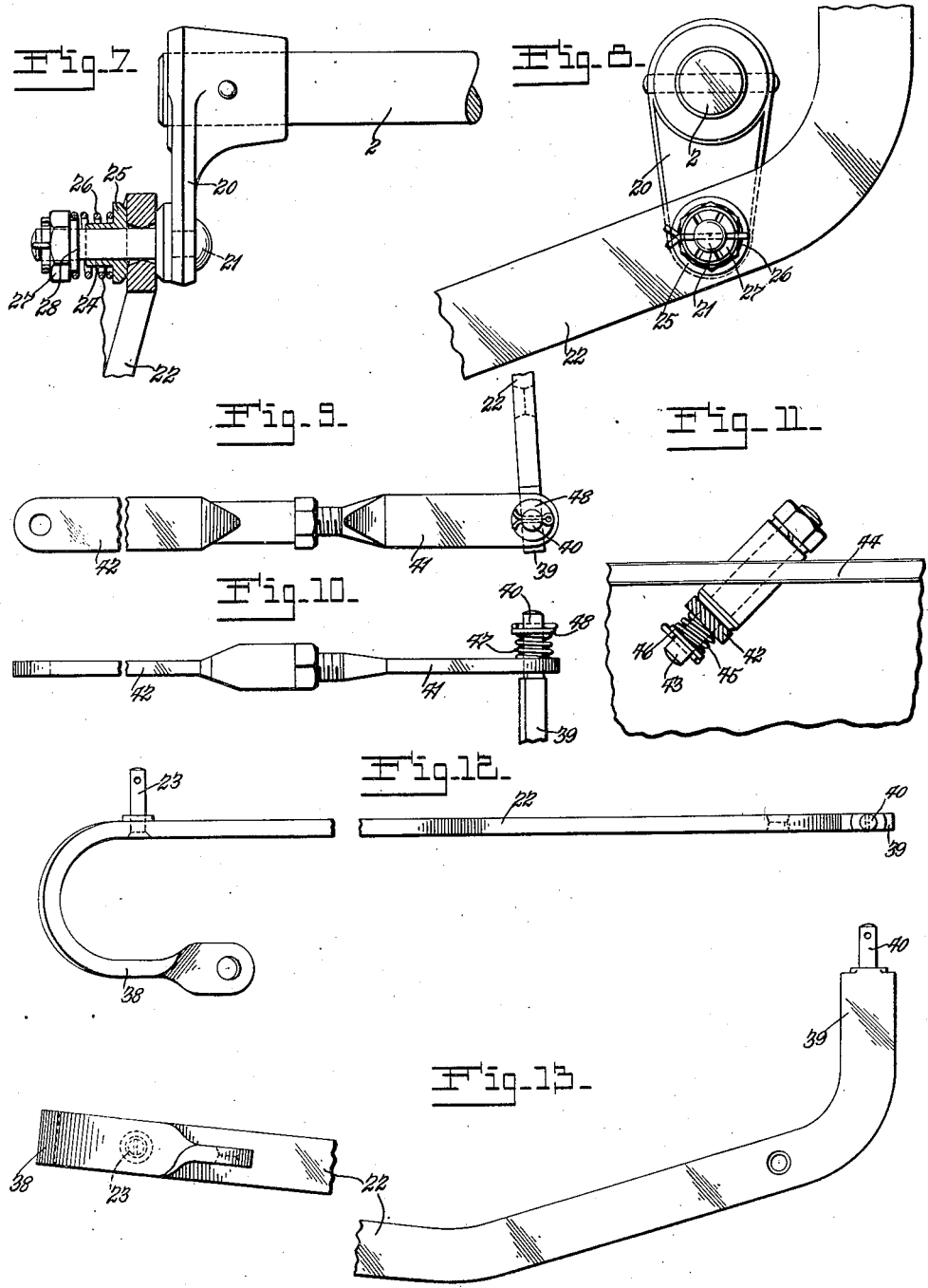

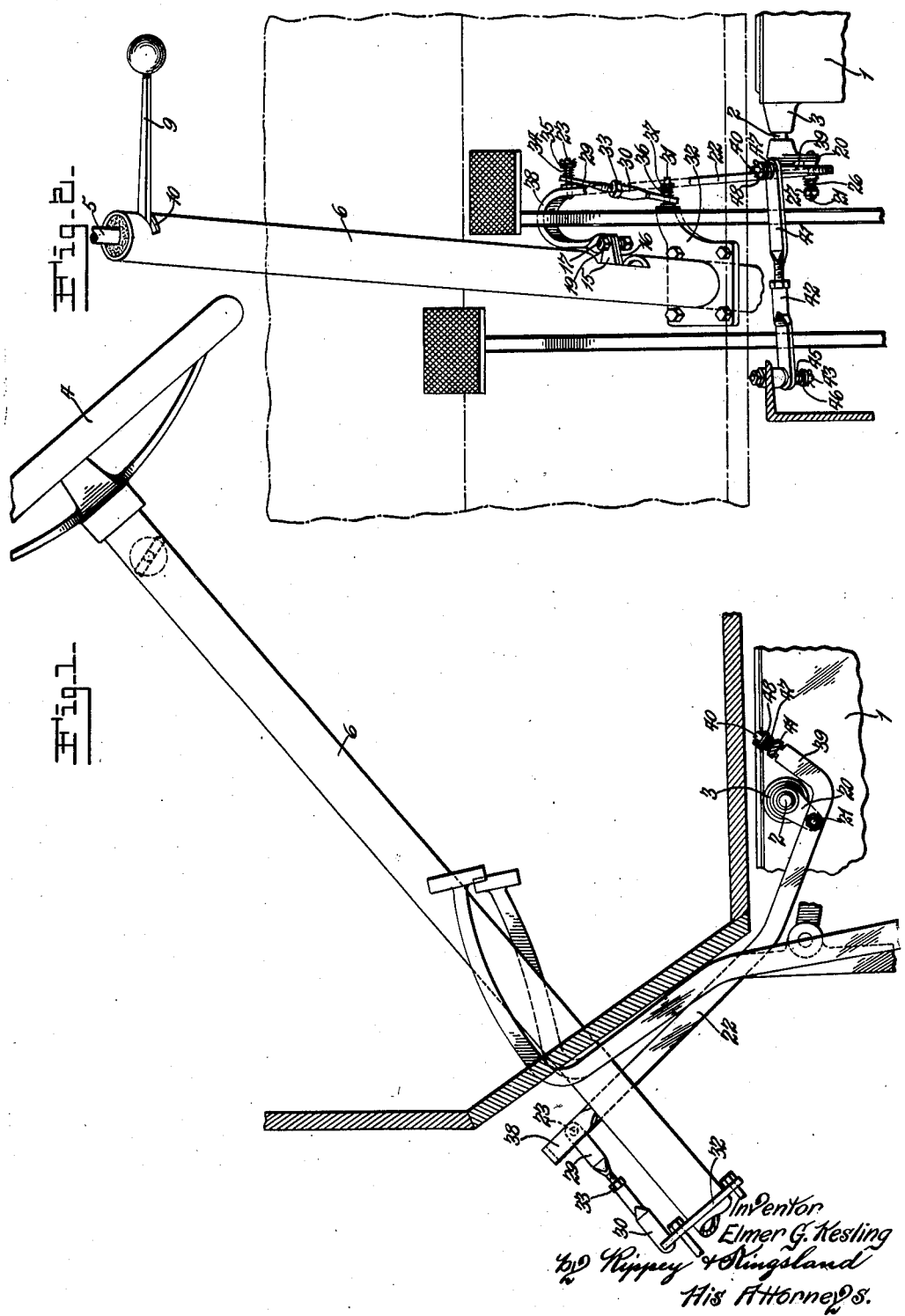

Patented Sept. 20, 1932

1,877,886

UNITED STATES PATENT OFFICE

ELMER G. KESLING, OF BLOOMFIELD, MISSOURI

SPEED CHANGING MECHANISM

Application filed March 7, 1931. Serial No. 520,942.

This invention relates to speed changing mechanism; and has special reference to speed changing mechanism for use in automobiles and other motor vehicles.

Objects of the invention are to provide an improved speed changing mechanism constructed and arranged and combined with the remaining essential parts of the vehicle, so that very little, if any, additional space is occupied by the elements of this invention; to provide a longitudinally movable rock shaft enclosed within the housing of the steering column and thereby concealed and encased in a usual part of the vehicle, and provided with improved connections for controlling the transmission gear elements in order to vary the speed of the vehicle by the movement of said shaft; to provide a construction whereby many of the parts heretofore provided in connection with longitudinally movable rock shafts for effecting such speed control are eliminated; to provide an improved speed changing mechanism comprising the essential features indicated and constructed and arranged, so that it may well be embodied in the vehicle during the initial construction thereof in order to present a finished and completed appearance and avoiding the appearance of accessories applied to the vehicle after its initial construction; and to obtain all of the other advantages of the construction hereinafter disclosed.

Other objects will be apparent from the following description, reference being made to the accompanying drawings, in which—

Fig. 1 is a side elevation of parts of the speed control mechanism of an automobile having my invention combined therewith.

Fig. 2 is a rear elevation.

Fig. 3 is an enlarged view with parts in section showing the manner in which my improved longitudinally movable rock shaft is cooperatively combined with the steering column of the automobile and enclosed in the usual housing therefor.

Fig. 4 is a cross sectional view on the line 4—4 of Fig. 3.

Fig. 5 is a vertical sectional view on the line 5—5 of Fig. 3.

Fig. 6 is a cross sectional view on the line 6—6 of Fig. 3.

Fig. 7 is an enlarged detail view showing the connection between the gear control spindle and the actuating link therefore.

Fig. 8 is an end elevation of the device shown in Fig. 7.

Fig. 9 is a view of the member that is connected to one end of the actuating link for the gear control spindle.

Fig. 10 is a side edge elevation of said member.

Fig. 11 is a detail view showing the supporting connection of a link from the actuating member of the gear control spindle.

Fig. 12 is a broken side edge elevation of the actuating member for the gear control spindle.

Fig. 13 is a broken side elevation of said member.

The housing 1 encloses transmission gearing that is controlled by a spindle 2 supported for longitudinal and rocking movements in a bearing 3. The present invention is not concerned with the construction of the gearing that is within the housing 1, with the exception that it is to be understood that variable speeds are obtainable from said gearing by shifting the spindle 2 to different longitudinal positions and by rocking said spindle. The present invention comprises mechanism for imparting these longitudinal and rocking movements to the spindle 2 so as to control the gearing within the housing 1 in the usual manner.

The usual steering wheel 4 is attached to the upper end of a steering shaft or post 5 rotatively supported within a tubular housing 6.

I utilize the usual housing 6 to enclose and to cooperate with parts of the present invention by operation of which the longitudinal and rocking movements are imparted to the spindle 2.

My invention comprises a tubular shaft 7 mounted in the housing 6 and enclosing a portion of the shaft 5. The shaft 7 is supported and guided by the shaft 5 by means of bushings 8, so that said shaft 7 may turn and move longitudinally with respect to the shaft 5.

A lever 9 extends through an inclined slot 10 in the housing 6 and has on its inner end a bifurcation 11 between the arms of which the shaft 7 is embraced. Pivots 12 connect the arms of the bifurcation 11 with diametrically opposite portions of the tubular shaft 7, so that by proper manipulation of the lever 9 the shaft 7 may be moved longitudinally along the shaft 5 or turned about said shaft 5, as desired.

A pair of nuts 13 and 14 are screwed on the lower end of the shaft 7 and are engaged by a clamping device that holds them in rigid relationship with respect to each other and to said shaft 7. Diverging arms 15 and 16 project from the nuts 13 and 14 and are connected and forced toward each other by the clamping device. In the arrangement shown, the clamping device comprises a bolt 17 projecting through holes in the arms 15 and 16 and having thereon a rigid shoulder 18 abutting against the arm 16, and a nut 19 screwed on the end of said bolt 17 against the arm 15 effectively to force the arms 15 and 16 toward each other and thereby impart strains and stresses to the nuts 13 and 14 and lock said nuts in connection with the threads on the shaft 7. The nut 19 is removable and replaceable in order to permit removal and replacement of the bolt 17 and thereby permits adjustment of the nuts 13 and 14. This construction constitutes an adjustable crank arm connection on the lower end of the shaft 7.

A crank arm 20 is attached to the end of the spindle 2. A pivot member 21 is rigid with the crank arm 20. The actuator for imparting longitudinal and rocking movements to the spindle 2 by operation of the shaft 7 is connected with the bolt 17 and with the pin 21.

Said actuator comprises a combined link and lever member of novel construction and arrangement including an intermediate portion 22 supporting at one end a pin 23 and having its opposite end provided with a hole through which the pin 21 extends. A sleeve 24 (Fig. 7) is mounted on the pin 21 and is rigid with a washer flange 25 that is pressed against the actuator member 22 by a spring 26 interposed between said washer flange 25 and a nut 27 that is screwed on the outer end of the pin 21. The sleeve 24 limits extent of longitudinal play or movement of the parts on the pin 21 by coming into contact with an annular flange 28 in connection with the inner side of the nut 27. Sufficient space between the end of the sleeve 24 and the adjacent end of the flange 28 is provided to permit free and easy movement of these parts as required in the operation of the invention. Like parts are used in connection with the bolt 17.

The pin 23 is pivotally connected with one end of a link member 29, the opposite end of said link member having adjustable connection with an adjacent end of a link member 30. The opposite end of the link member 30 is pivotally mounted on a pin 31 projecting from a rigid part 32 of the motor vehicle. The adjustable connection between the link members 29 and 30 may be obtained by screwing the end of the member 29 into the adjacent end of the member 30 in a familiar manner. The parts may be locked in any adjustment in which they are placed by a lock nut 33.

A spring 34 on the pin 23 has one end bearing against the link member 29 and the opposite end against an abutment 35 secured on the pin 23. A similar spring 36 is mounted on the pin 31 and has one end pressing against the link member 30 and the opposite end against an abutment 37 secured on said pin 31. This connection provides a species of support and control device for the actuator member 22 permitting the necessary longitudinal and oscillating movements of said member to impart longitudinal and rocking movements to the spindle 2 by the appropriate longitudinal and rocking movements of the shaft 7.

This actuator member 22 has an extension 38 at one end formed and shaped for appropriate pivotal connection with the bolt 17 (Fig. 2).

The actuator link device 22 has at its opposite end an angular extension 39 provided on its end with a projection 40 that is engaged in a hole in one end of a link member 41. The opposite end of the link member 41 is screwed into the adjacent end of a link member 42 and the opposite end of said link member 42 is pivoted on a bolt 43 rigidly supported by a rigid part 44 on the motor vehicle. The spring 45 encircling the bolt 43 has one end bearing against the link member 42 and the opposite end against an abutment 46 secured on said bolt 43. A spring 47 mounted on the projection 40 has one end bearing against the link member 41 and the opposite end against an abutment 48 secured to said projection 40. These pivotal link connections constitute novel fulcrums for the actuating link member whereby longitudinal movements are imparted to the spindle 2 by the appropriate longitudinal movements of the shaft 7.

From the foregoing description, considered in connection with the drawings wherein the different parts are indicated, it is clear that the link 22 is characterized by sufficient rigidity for its intended purpose and is pivotally connected directly to the crank 15—16 that is rigid on the lower end of the shaft 7 and to the crank 20 that is rigid on the spindle 2, and, therefore, is a single actuating element connecting said shaft 7 with said spindle 2, whereby turning movements of the shaft 7 imparted thereto by the lever 9 will rock the spindle 2 due to the longitudinal movements imparted to the link connection 22. And it is also clear that the link 22 engages pivotal supports 23 and 40 which are properly positioned and spaced from the shaft 7 and from the spindle 2, respectively, and are held immovable in the respective lines of longitudinal movements of said shaft and spindle by supporting link fulcrums attached to stationary parts of the automobile, whereby longitudinal movements of the shaft 7 imparted thereto by the lever 9 will move the spindle 2 longitudinally by the peculiar oscillating movements of the link connection 22, etc. The distance of the pivotal supports 23 and 40 from the shaft 7 and from the spindle 2, respectively, constitutes the lever feature of the actuator 22, etc., so that these peculiar oscillating movements of the link connection 22, etc. are caused by the longitudinal movements of the shaft 7 in cooperation with the pivotal supports 23 and 40 of said link connection. The link fulcrums swing on their respective supports 31 and 43, and are of such length that they do not interfere with the longitudinal movements of the link actuating element 22. It is obvious that because the pivot 23 is held immovable longitudinal movement of the shaft 7 will oscillate the link 22 and, since the pivot 40 is also held immovable, the oscillation of said link 22 will move the spindle 2 longitudinally. Of course, it is understood that the rocking movements of the spindle 2 are speed changing movements, and the longitudinal movements of the spindle 2 are speed selective movements. Since speed selection can be made only when the transmission gear set (not shown) of the automobile is in neutral speed position, the longitudinal movements of the spindle 2 can be effected only during that position of said gear set.

From the foregoing description, it is clear enough that my invention obtains all of its intended objects and purposes in a very efficient manner. The invention can be built into the motor vehicle during its initial construction, occupies much less space than the usual variable speed mechanism, is more accessible for operation by the driver in his usual posture in driving and controlling the vehicle, and is more easily operated and controlled than any other variable speed mechanism of the concealed and accessible type with which I am familiar. It is clear that the construction, arrangement and relaionship of the parts may be widely varied within the scope of equivalent limits without departure from the scope and spirit of the invention. I contemplate such variations as may be required or desirable to adapt the invention to automobiles of different types and such variations will readily be apparent to those skilled in the art without specific illustration and description.

I claim:—

1. Mechanism of the character described comprising a rockable and longitudinally movable shaft, a rockable and longitudinally movable spindle, cranks attached to said shaft and said spindle respectively, an actuator element pivotally connecting said cranks for rocking said spindle by rocking movements of said shaft, and fulcrum devices pivotally connected with and controlling said actuator whereby longitudinal movements of said shaft will move said spindle longitudinally.

2. Mechanism of the character described comprising a longitudinally movable and rockable shaft, a longitudinally movable and rockable spindle supported at a distance from and angularly with respect to said shaft, an actuator element operatively connecting said shaft and said spindle for rocking said spindle by rocking movements of said shaft, and means controlling said actuator element whereby longitudinal movements of said shaft will move said spindle longitudinally.

3. Mechanism of the character described comprising a longitudinally movable and rockable shaft, a spindle supported for longitudinal and rocking movements at a distance from and at an angle with respect to said shaft, an actuator element pivotally connecting said shaft and said spindle for rocking said spindle by rocking movements of said shaft, and a number of fulcrum devices having pivotal connection with and controlling said actuator element to move said spindle longitudinally when said shaft is moved longitudinally.

4. Mechanism of the character described comprising a longitudinally movable and rockable shaft, a spindle supported for longitudinal and rocking movements, an actuator element pivotally connecting said shaft and said spindle for rocking said spindle by rocking movements of said shaft, and means connected with and controlling said actuator element effectively to move said spindle longitudinally when said shaft is moved longitudinally.

5. Mechanism of the character described comprising a longitudinally movable rock shaft, a spindle supported for longitudinal and rocking movements, an actuating link having pivotal connections with said shaft and said spindle respectively for rocking said spindle by rocking movements of said shaft, and means controlling said actuating link to move said spindle longitudinally by longitudinal movements of said shaft.

6. Mechanism of the character described comprising a longitudinally movable rock shaft, a longitudinally movable rocking spindle, a link having one end pivotally connected with said shaft and having an intermediate portion pivotally connected with said spindle for rocking said spindle by rocking movements of said shaft, a fulcrum element pivotally connected with said link beyond the pivotal connection with said spindle, and an additional fulcrum element pivotally connected with said link between said shaft and said spindle, said fulcrum elements controlling said link effectively to move said spindle longitudinally by longitudinal movements of said shaft.

7. Mechanism of the character described comprising a shaft that is fixed as to its longitudinal position, a shaft mounted for longitudinal and rocking movements about said first shaft, a longitudinally movable and rockable spindle supported at a distance from and angularly with respect to said second shaft, an actuator element operatively connecting said second shaft and said spindle for rocking said spindle by rocking movements of said second shaft, and means controlling said actuator element whereby longitudinal movements of said second shaft will move said spindle longitudinally.

8. Mechanism of the character described comprising a shaft having a fixed longitudinal position, a shaft mounted for turning movements about and longitudinal movements along said first shaft, a housing enclosing said two shafts and having a slot therein, a lever extending through said slot and having pivotal connection with said second shaft and fulcruming against the walls of said slot, a longitudinally movable and rockable spindle, an actuator element operatively connecting said second shaft and said spindle for rocking said spindle by rocking movements of said second shaft, and means controlling said actuator element whereby longitudinal movements of said second shaft will move said spindle longitudinally.

9. Mechanism of the character described comprising a rock shaft having a fixed longitudinal position, a tubular shaft mounted for rocking movements about and longitudinal movements along said fixed shaft, means for rocking and moving said second shaft longitudinally as desired, a spindle supported for longitudinal and rocking movements, an actuating link having pivotal connections with said second shaft and with said spindle respectively for rocking said spindle by rocking movements of said second shaft, and a number of fulcrums controlling said actuating link to move said spindle longitudinally by longitudinal movements of said second shaft.

10. Mechanism of the character described comprising a longitudinally movable rock shaft, a spindle supported for longitudinal and rocking movements, an actuating link having pivotal connections with said shaft and said spindle respectively, and means connected with and controlling said actuating link to cause said link to move said spindle longitudinally by longitudinal movements of said shaft and permitting said link to rock said spindle when said shaft is rocked independently of any effect of said means.

11. Mechanism of the character described comprising a longitudinally movable rock shaft, a device for supporting and guiding said shaft in its longitudinal and rocking movements, a spindle supported for longitudinal and rocking movements, cranks attached to said shaft and said spindle respectively, a pivot element attached to the crank on said rock shaft and holding said crank rigidly in selected adjustments on said shaft, and a link connecting said pivot element with said crank that is attached to said spindle for rocking said spindle by rocking movements of said shaft.

12. Mechanism of the character described comprising a longitudinally movable rock shaft, a device for supporting and guiding said shaft in its longitudinal and rocking movements, a spindle supported for longitudinal and rocking movements, cranks attached to said shaft and said spindle respectively, a pivot element attached to the crank on said rock shaft and holding said crank rigidly in selected adjustments on said shaft, a link connecting said pivot element with said crank that is attached to said spindle for rocking said spindle by rocking movements of said shaft, and means controlling said link to move said spindle longitudinally by the longitudinal movements of said shaft.

13. Mechanism of the character described comprising a spindle supported for longitudinal and rocking movements, an actuating link having pivotal connection with said spindle, a shaft supported for longitudinal and rocking movements and pivotally connected with said actuating link for rocking said spindle by rocking movements of said shaft, and devices controlling said actuating link for moving said spindle longitudinally when said shaft is moved longitudinally.

14. Mechanism of the character described comprising a spindle supported for longitudinal and rocking movements, an actuating link having pivotal connection with said spindle for rocking said spindle and moving said spindle longitudinally, and mechanism for operating said link to rock said spindle or to move said spindle longitudinally as desired.

15. Mechanism of the character described comprising a longitudinally movable rock shaft, a spindle supported for longitudinal and rocking movements, an actuating link having pivotal connections with said shaft and said spindle respectively for rocking said spindle by rocking movements of said shaft, and fulcrum elements pivotally connected with said actuating link for causing said link to move said spindle longitudinally by longitudinal movements of said shaft.

16. Mechanism of the character described comprising a longitudinally movable rock shaft, a spindle supported for longitudinal and rocking movements, an actuating link having pivotal connections with said shaft and said spindle respectively for rocking said spindle by rocking movements of said shaft, and a pair of fulcrum elements pivoted to said actuating link between said pivotal connections and beyond the pivotal connection of said actuating link with said spindle respectively for moving said spindle longitudinally by longitudinal movements of said shaft.

17. Mechanism of the character described comprising a spindle supported for longitudinal and rocking movements, a longitudinally movable rock shaft, a lever for rocking and for moving said shaft longitudinally as desired, an actuating link having pivotal connections with said shaft and said spindle respectively for rocking said spindle by rocking movements of said shaft, and a pair of pivotally supported fulcrum elements pivotally connected with said link in a relationship in which the pivotal connection of said link with said spindle is between the pivotal connection of said link with said fulcrum elements, said fulcrum elements causing said link to move said spindle longitudinally by longitudinal movements of said shaft.

18. Mechanism of the character described comprising a longitudinally movable rock shaft, a spindle supported for longitudinal and rocking movements, an actuating link member having pivotal connections with said shaft and said spindle respectively for rocking said spindle by rocking movements of said shaft and moving said spindle longitudinally by longitudinal movements of said shaft, and means in connection with said actuating link member for controlling oscillating movements thereof by said movements of said shaft.

19. Mechanism of the character described comprising a longitudinally movable rock shaft, a spindle supported for longitudinal and rocking movements, an actuating link member mounted for longitudinal and oscillating movements and having pivotal connection with said shaft and said spindle, and means in connection with said link member for controlling said oscillating movements of said link member by said shaft.

20. Mechanism of the character described comprising a longitudinally movable rock shaft, a spindle supported for longitudinal and rocking movements, an actuating link member mounted for longitudinal and oscillating movements and having pivotal connection with said shaft for movement thereby and with said spindle for rocking and moving said spindle longitudinally, and means connected with said link member for controlling the oscillating movements of said link member by said shaft.

21. Mechanism of the character described comprising an operating means, a spindle supported for longitudinal and rocking movements, an actuating link member mounted for oscillating and longitudinal movements and having pivotal connection with said operating means and with said spindle respectively for imparting longitudinal and rocking movements to said spindle, and a pair of fulcrum elements pivoted to said actuating link member toward the respective ends of said link member and controlling the oscillating movements of said link member by said operating means.

22. Mechanism of the character described comprising an operating means, a spindle supported for longitudinal and rocking movements, a pair of fulcrum elements, and an actuating link member having pivotal connection with said operating means for movement thereby and with said spindle for imparting longitudinal and rocking movements to said spindle and having pivotal connection with and being oscillated under control of said fulcrum elements when said link member is operated by said operating means.

23. Mechanism of the character described comprising an operating means, a spindle supported at an angle with respect to said operating means for longitudinal and rocking movements, an actuating link member having pivotal connection with said operating means for movement thereby and with said spindle for imparting longitudinal and rocking movements to said spindle, and a pair of fulcrum elements pivoted to spaced portions of said actuating link member and controlling the oscillating movements of said link member by said operating means.

24. Mechanism of the character described comprising an operating means, a spindle supported for longitudinal and rocking movements, an actuating link member having pivotal connection with said operating means and with said spindle, and a pair of pivotally supported fulcrum elements having pivotal connection with spaced portions of said actuating link member controlling the oscillating movements of said link member when said member is operated by said operating means.

ELMER G. KESLING.